G. B. VAN AKIN & J. E. BORST.
MACHINE FOR REWINDING FILMS.
APPLICATION FILED OCT. 17, 1913.

1,121,445.

Patented Dec. 15, 1914.
3 SHEETS—SHEET 1.

WITNESSES

INVENTORS
GEORGE B. VAN AKIN,
JOHN E. BORST,
BY
ATTORNEYS

G. B. VAN AKIN & J. E. BORST.
MACHINE FOR REWINDING FILMS.
APPLICATION FILED OCT. 17, 1913.

1,121,445.

Patented Dec. 15, 1914.
3 SHEETS—SHEET 2.

WITNESSES
E. M. Callaghan
Walton Harrison

INVENTORS
GEORGE B. VAN AKIN,
JOHN F. BORST,
BY Munn & Co.
ATTORNEYS

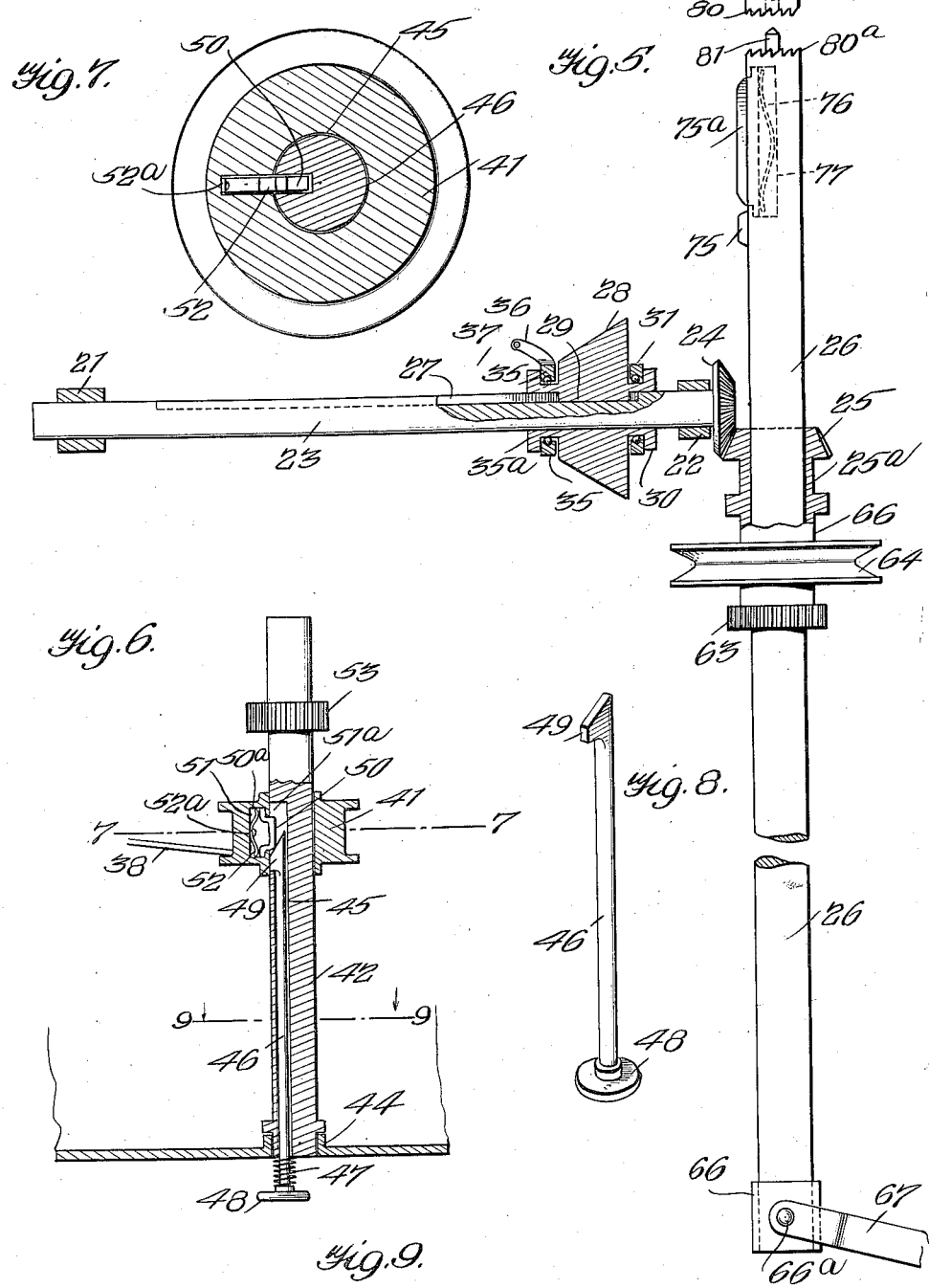

UNITED STATES PATENT OFFICE.

GEORGE B. VAN AKIN AND JOHN E. BORST, OF HUDSON, MICHIGAN.

MACHINE FOR REWINDING FILMS.

1,121,445.  Specification of Letters Patent.  Patented Dec. 15, 1914.

Application filed October 17, 1913. Serial No. 795,708.

*To all whom it may concern:*

Be it known that we, GEORGE B. VAN AKIN and JOHN E. BORST, citizens of the United States, and residents of Hudson, in the county of Lenawee and State of Michigan, have made certain new and useful Improvements in Machines for Rewinding Films, of which the following is a specification.

Our invention relates to motion picture mechanism, our more particular purpose being to provide a convenient means for rewinding the photographic films, so as to leave these films in proper shape and position to be unwound.

More particularly stated, we seek to provide for rewinding the films under such conditions that the films are relieved as far as possible of undue tension, and the tension to which they are necessarily subjected is well distributed.

We also seek to compensate for the difference in speed to which a film while being used is subjected; the speed of the film being regulated and governed according to the external diameter of the film as coiled up.

In accomplishing these objects we also seek to prevent the films from breaking.

Reference is made to the accompanying drawings forming a part of this specification, and in which like letters indicate like parts.

Figure 1:
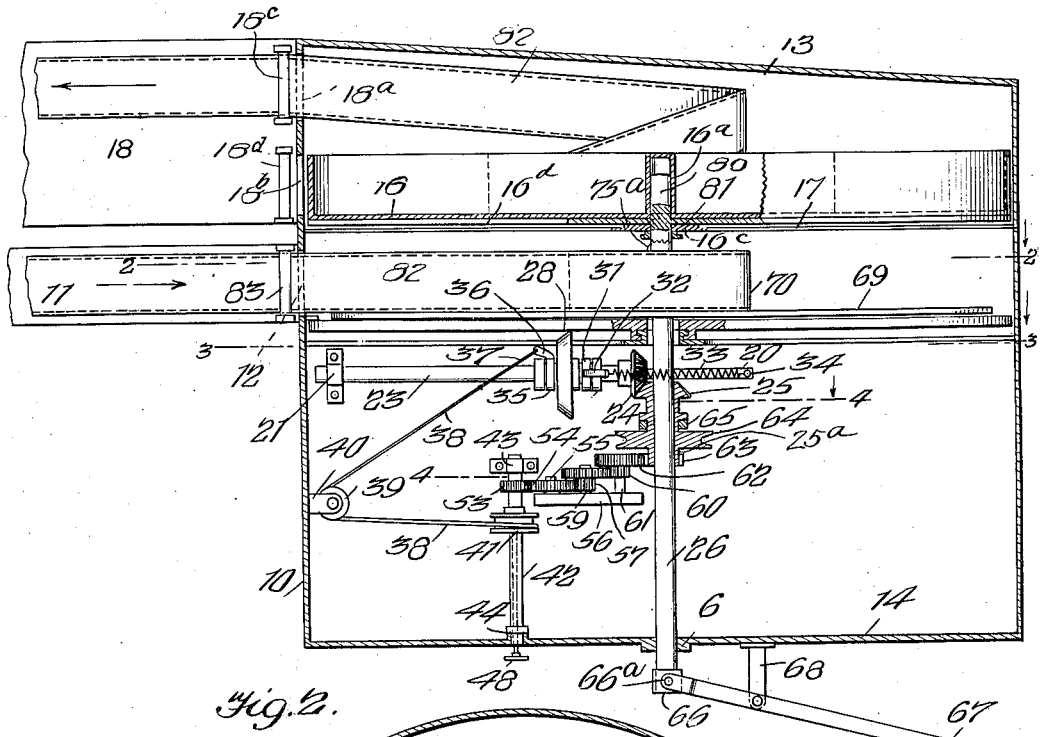
Figure 2:
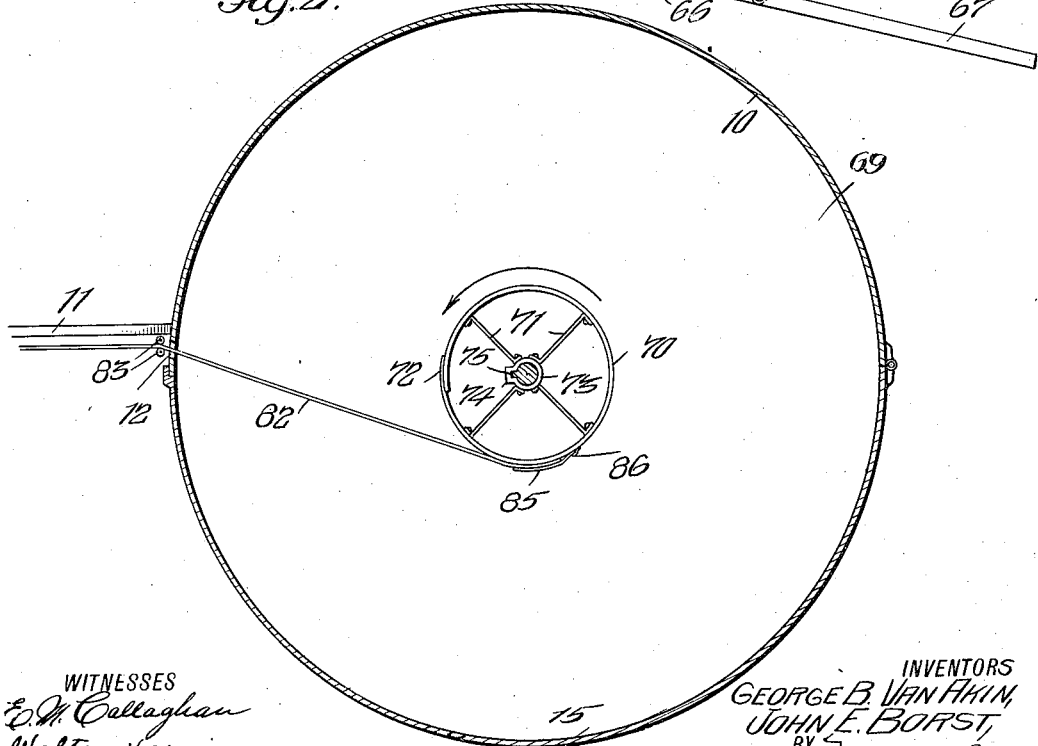
Figure 3:
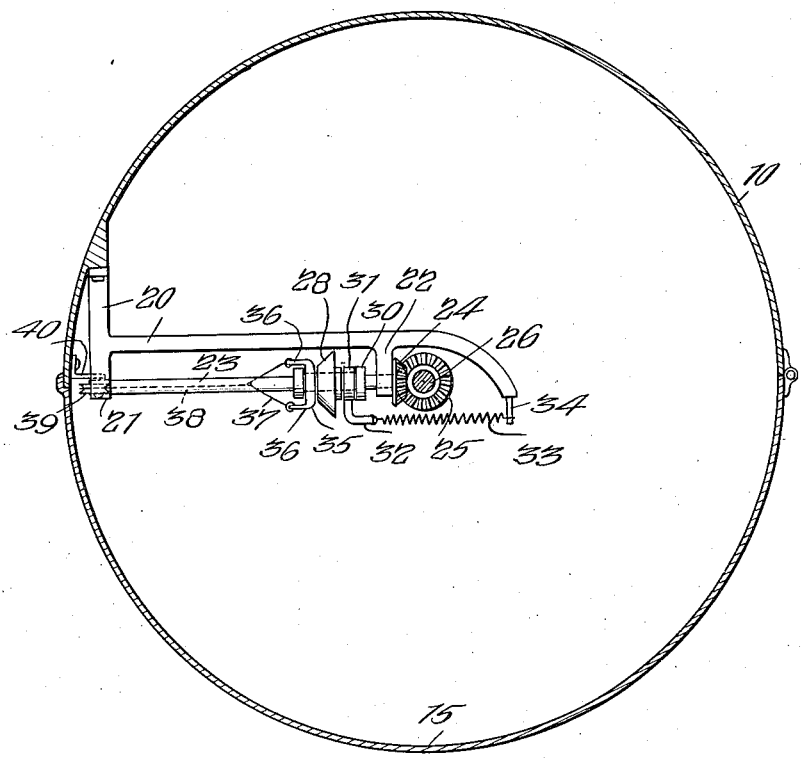
Figure 4:
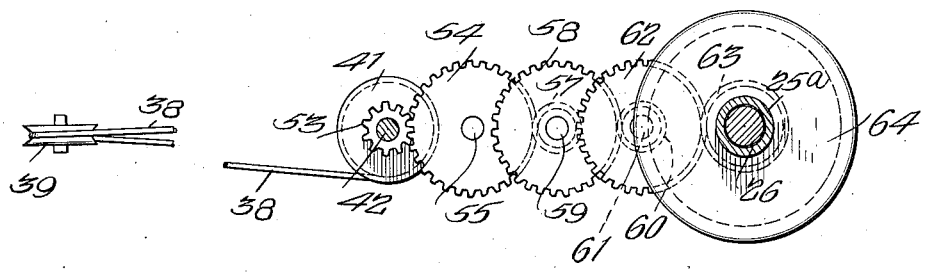

Figure 1 is a substantially vertical section through our improved device. Fig. 2 is a section on the line 2—2 of Fig. 1, looking in the direction of the arrow. Fig. 3 is a section on the line 3—3 of Fig. 1, looking in the direction of the arrow. Fig. 4 is a section on the line 4—4 of Fig. 1, looking in the direction of the arrow and showing a train of gears. Fig. 5 is a fragmentary view, partly in section and partly in elevation, showing the main shaft and certain gear members coacting therewith. Fig. 6 is a detail showing in section, a winding drum and its shaft, together with means for disconnecting said winding drum from said shaft in order to restore these parts to a predetermined relative position. Fig. 7 is a section on the line 7—7 of Fig. 6, looking in the direction of the arrow. Fig. 8 is a detail, showing in perspective a sliding key forming a part of the mechanism shown in Fig. 6. Fig. 9 is a section on the line 9—9 of Fig. 6, looking in the direction of the arrow.

For the purpose of inclosing most of the working parts, we employ a casing 10 having the general form of a cylinder. Extending laterally from this casing is a guide plate 11, and adjacent this guide plate the casing is provided with a slot 12. The casing is provided with a top plate 13 and a bottom plate 14, these plates being practically heads having the form of disks, whereby the ends of the casing are closed. The casing is provided with a door 15 of semi-cylindrical form. This door may be swung open for the purpose of removing the films as hereinafter described, and also for the purpose of attaining access to the interior of the casing for other purposes. Removably mounted below the top plate 13 is a pan 16. This pan is provided centrally with a sleeve 16$^a$, rigid relatively to it.

A spider 17 secured to the inside of the casing is provided centrally with a bearing 16$^c$, and supports a reel plate, shown at 16$^d$, and which is revoluble. A short shaft section 80 is journaled within the bearing 16$^c$ and upon this shaft section fits the sleeve 16$^a$. The pan 16 is thus adapted to turn, together with the shaft section 80.

A guide plate 18 is mounted upon the casing and extends laterally therefrom. Adjacent the guide plate 18, the casing is provided with two slots 18$^a$, 18$^b$. Rollers 18$^c$, 18$^d$ are disposed adjacent these slots, for guiding the films.

Mounted rigidly within the casing is a bracket 20 which carries two bearings 21—22, these bearings support a revoluble shaft 23. Mounted rigidly upon one end of this shaft is a bevel pinion 24 which meshes with another bevel pinion 25, the latter being integral with a sleeve 25$^a$, this sleeve loosely encircling a shaft 26. The shaft 23 is provided with a spline groove 27. Slidably mounted upon the shaft 23 is a friction cone pulley 28, the latter being provided with a portion 29 projecting into the groove 27 and for this purpose, acts as a key for preventing relative rotation as between the cone pulley 28 and shaft 23. The cone pulley 28 is provided with a neck 30 and encircling this neck is an anti-friction swivel 31, having a general annular form. Mounted upon this swivel is a horn 32, and connected with this horn is a spiral spring 33. This spring is connected with a pin 34, which is supported by the bracket 20. The friction pulley 28 is further provided with a neck 35$^a$ and encircling this neck is an anti-friction swivel 35, the latter being provided with two horns 36. Connected with these two horns is a bridle 37. A cable 38 is connected with this bridle and runs on a guide pulley 39, the latter being supported upon a bracket 40. The cable 38 is secured to a spool 41, serving the purpose of a winding drum. This winding drum is mounted loosely upon a shaft 42, which is supported in bearings 43—44. The shaft 42 is provided with a key-way 45 extending in the general direction of its length and parallel with its axis, as may be understood from Fig. 6. Slidably mounted in this key-way is a key 46 provided at one of its ends with cam 49. The key 46 is further provided at its lower end with a button 48 and with a spiral spring 47 disposed adjacent this button and engaging the adjacent lower end of the shaft 42. The key 46 can be inserted in the key-way 45 from the back or top and before the winding drum 41 and gear 53 are keyed upon shaft 42.

The winding drum 41 is provided with a compartment 50$^a$ and mounted within this compartment is a bolt 50 having a general U-form, as will be understood from Fig. 6, and adapted to project slightly into the adjacent portion 51$^a$ of the key-way 45, this portion being shaped properly for the purpose. A leaf spring 52 is housed within the compartment 50$^a$ and engages the bolt 50 so as to press this bolt toward the axial center of the winding drum, thus tending to cause the bolt to lodge in a portion 51$^a$ of the key-way. A fastening 52$^a$ holds the spring 52 in position.

The spring 47 (see bottom of Fig. 6) tends normally to maintain the key 46 in its lowermost position, and therefore allows the bolt 50 to slip into the portion 51$^a$ of the key-way 45 and thus lock the winding drum 41 securely upon the shaft 42. When, however, the button 48 is pressed upwardly acording to Fig. 6 so that the spring 47 is compressed, the cam 49 pushes the bolt 51 radially outward and consequently dislodges this bolt from the adjacent portion of the key-way. The winding drum 41 is thus loosened relatively to the shaft 42 so that the winding drum and shaft are practically free relatively to each other.

Mounted rigidly upon the shaft 42 is a pinion 53, and meshing with this pinion is a gear wheel 54, the latter being revolubly mounted upon a stub shaft 55 carried by a bracket 56. The gear wheel 54 meshes with a pinion 57, this pinion being practically the hub of a gear wheel 58 so as to turn therewith. The pinion 57 and gear wheel 58 are revolubly mounted upon a stationary stub shaft 59. Meshing with the gear wheel 58 is a pinion 60. This pinion is connected rigidly with a gear wheel 62, these two parts being revolubly mounted upon a stationary stub shaft 61 carried by the bracket 56. A pinion 63, which is integral with the sleeve 25, meshes with the gear 62. A pulley 64 is also integral with this sleeve. A guide 65 supports the sleeve and holds the same in such position that the bevel gear 25 remains always in mesh with the bevel gear 24. For this purpose the sleeve 25$^a$ is provided with an annular bearing portion 66, as will be understood from Fig. 5. The shaft 26 at its lower end is mounted in a bearing 66, supported on a fork 66$^a$ carried by a lever 67, which is journaled upon a bracket 68 and is adapted to be operated by hand so as to raise and lower the shaft section 26.

A reel plate is shown at 69, the same being in this instance shown as two superposed and connected disks or plates, the lower one having on its underside an annular pendent flange or collar that engages and rotates on a flanged collar projecting upward from a fixed spider, or horizontal skeleton frame, attached to the inner periphery of the cylindrical casing 10. Detachably resting upon this plate 69 is a reel hub 70, of the form shown more particularly in Fig. 2. This reel hub has generally the form of an annular band, provided with radial arms 71 and with overlapping ends 72. The arms 71 are mounted rigidly upon a sleeve 73, this sleeve being provided with a projecting portion 74 serving as a splineway. Extending into this splineway is a rigidly mounted spline 75 with which the shaft section 26 is provided.

At 75$^a$ is a spline located just above the spline 75, but fitting loosely into a groove 77 with which the shaft section 26 is provided. A leaf spring 76 is fitted into this groove and engages the spline 75$^a$, the tendency of this spring being to force the spline 75$^a$ outwardly and to maintain it in proximate alinement with the spline 75, as may be understood from Fig. 5. The shaft section 78 is provided with an axially disposed dowel hole 79, and is further provided with a crown clutch member 80. The shaft 26 is provided with a dowel pin 81 or centering pin, which is adapted to fit into the dowel hole 79 so as to maintain the shaft sections 26 and 78 in exact registry with each other. The shaft section 26 is provided with a crown clutch member 80$^a$ mating the crown clutch member 80 so as to facilitate the locking of these two clutch members together.

When the outer or free end of the lever 67 is depressed, the shaft section 26 is raised upwardly so that the crown clutch member 80$^a$ is fitted against the crown clutch member 80, these two clutch members now acting practically as a single revoluble shaft. When, however, the outer or free end of the lever 67 is raised, the shaft section 26 is lowered so that the clutch member 80ª is drawn out of engagement with the clutch member 80. This enables the hub 70 to be readily removed and replaced.

A film is shown at 82 and passes between various guide rollers such as 83. As the film is gradually unwound from the pan 16, it is wound upon the hub 70. In doing this the film passes through the moving picture machine, substantially in the usual manner.

The hub 70 is collapsible for the purpose of enabling the film, when wound upon it in the form of a coil, to be readily removed. For this purpose the overlapping ends 72 are slided a little relatively to each other so that the general diameter of the hub becomes contracted. The film coiled upon the hub may now readily be removed and transferred to the pan 16.

The hub 70 is provided with a clasp 85, secured in position by a fastening 86, and having substantially the form of a leaf spring. One end of the film is forced underneath the clasp 85, which presses upon it after the manner of a leaf spring, as will be understood from Fig. 2. If now, the hub be turned in the direction indicated by the arrow, in Fig. 2, the film is gradually wound upon the hub and unwound from the coil resting upon the pan 16.

The pan 16 may be removed and an ordinary reel of the kind generally employed in transporting and handling films, may be substituted for it. When this is done the slot 18ᵇ is in registry with the ordinary reel just mentioned, and the film from the reel may be led out through the slot 18ᵇ and between the rollers 18ᶜ, to the moving picture machine, and thence back between the rollers 83 and through the slot 12 to the collapsible hub 70.

The operation of our device is as follows:—The parts being arranged and assembled as indicated, the door 15 is opened and if there is any film upon the collapsible hub 70 the hub is taken out and collapsed, the film removed, and transferred to the pan 16. The inner end of the film is then led off through the rollers 18ᶜ to the moving picture machine, and rollers 83, the end of the film being secured to the hub 70 by aid of the clasp 85, as above explained. The button 48 is pressed upwardly so as to loosen the winding drum 41 relatively to the shaft 42. The cable 38 is thus slackened, and the spring 33, by pulling upon the horn 32 of the swivel 31 shifts the friction wheel to its limit to the right, according to Fig. 1. Pressure upon the button 48 being relaxed, the winding drum 41 is rendered rigid relatively to the shaft 42. A cable is now connected from the pulley 64 to a pulley carried by the moving picture machine, and when the last mentioned machine is started into action the pulley 64 is rotated. This turns the sleeve 25ª and causes the bevel gear 25 to turn the bevel gear 24 and shaft 23. Rotation of this shaft causes the friction wheel 28 to turn the reel plate 69 thus causing the hub 70 to rotate and wind the film upon it. The hub turns the shaft 26 which rotates freely. Motion is transmitted from the pulley 64 through the various gear members 63, 62, 60, 58, 57, 54 and 53 to the shaft 42. Rotation of this shaft turns the winding drum 41 so as to wind up the cable 38. This causes the swivel 35 to move to the left according to Fig. 1 and in doing this to move the friction wheel 28 to the left. As the friction wheel 28 travels radially outward from the shaft 26 it acts upon portions of successively larger diameter of the reel plate 69. Hence, rotation of this reel plate and of the hub 70 is rendered slower as the friction wheel 28 travels toward the left, according to Fig. 1. Since, however, the coil of film accumulating upon the hub 70 is of gradually increasing diameter, the film travels no more rapidly than before. That is to say, a uniform motion applied to the pulley 64 causes the film to travel at a substantially uniform rate and the film is taken up at the same rate. The hub 70 having received the entire film, the machine is stopped, the button 48 is pressed, as above described, so as to restore the friction wheel 28 to its normal position, that is, at its limit to the right according to Fig. 1. The door is now open, the lever 67 swung by hand and the collapsible hub 70, together with the film coiled upon it, is removed. The hub being now collapsed, the film is detached from it and placed in the pan 16. The hub is next placed back in the machine, the end of the film run through the rollers 18ᶜ—83 and the moving picture machine, and secured by the clasp 85, as indicated in Fig. 2. The door being now closed and the moving picture machine started up, as before mentioned, motion is again communicated to the pulley 64 and to the various other moving parts, the cycle of operations being repeated.

It will be noted that as the film is wound off from the inside of the coil resting in the pan 16, it is rewound in such manner that, when the operation is completed, practically all that is necessary is to perform the few steps above stated, and then the film is ready to be used over again. No rewinding of the film is necessary except in the sense that the film, when acted upon by the moving picture machine, is both wound and rewound at a single operation, which is automatic.

Sometimes it may be desirable to unwind the film from an ordinary reel of the kind generally used for shipping and handling films. For this purpose the reel in question is substituted for the pan 16, as above described, and the film is fed continuously from this reel, out through the moving picture machine and back, so as to be wound upon the hub 70. The film being thus once unwound from the reel upon which it is shipped, need not be rewound upon that reel, as it can be transferred to the pan and used over again, as above described.

We claim:—

1. A device of the character described comprising means for supporting a film to be unwound, a collapsible hub upon which said film is to be rewound, means for supporting said collapsible hub, a reel plate supporting said hub, a shaft extending through said hub, a sleeve encircling said shaft, and gearing connected with said sleeve and driven thereby for the purpose of turning said plate at a gradually decreasing speed.

2. A device of the character described comprising a member upon which a film is to be wound, a revoluble plate for supporting said member, a friction wheel engaging said revoluble plate, means for turning said friction wheel and for causing said friction wheel to move bodily away from the center of rotation of said revoluble plate so as to confer a differential revoluble movement upon said revoluble plate, and means controllable at the will of the operator for restoring said friction wheel to a predetermined normal position.

GEORGE B. VAN AKIN.
JOHN E. BORST.

Witnesses:
M. E. TRIPP,
GRACE C. JOSLYN.